(12) United States Patent
Richards

(10) Patent No.: X3362
(45) Date of Patent: Aug. 10, 1821

(54) LOOM,SAIL CLOTH

(76) Inventor: James Richards

James Richards
Letters Patent

The Schedule referred to in these Letters Patent and making part of
the same, containing a description in the words of the said James Rich
ards himself of his improvement in manufacturing sail cloth.

The use of Starch in the manufacture of sail cloth has always been
highly prejudicial, and to do without it has heretofore been thought
impossible: it causes the cloth sooner to mildew and exclude it
from air has been an object with our manufacturing men particu-
larly in our country as the Commissioners of the Navy have wished
the cloth for the service of the United States to be without Starch.
The different qualities of sail cloth are by us designated by the
following Numbers 1 2.3.4.5 6 7.8. the four first numbers
are double threads. the latter numbers are single numbered [illegible] 4: have
by others been manufactured without Starching. but although it
has been repeatedly tried. yet none succeeded in making the single thread-
ed cloth without the use of Starch. I have accomplished this desirable
object by continual experiment, attention, and expence. It will be
necessary to proceed regularly through the different operations in
the manufacture of flax. in order to afford an adequate and compre
hensive explanation as in every one more or less is there something
to remark. The first operation is hackling and must be particu-
larly attended to. the . . . flax must be more hackeled than is
commonly done and the Staple must be equalized as nearly as
possible. the quantity of tow therefore will be greater, and con-
sequently the loss in the operation is greater to the manufacturer.
In the operation of spinning it is necessary that the fibres
of the flax should be wet on the frame previous to its being spun,
without this the cloth cannot be wove without Starch. attention
must be paid to have it spun harder. or twisted for a longer time
than has been . . . heretofore practised as by twisting harder
the fibres of the thread are not so easily raised in passing the reeds in the operation of weaving and thus starch is rendered unne-
cessary. By thus spinning harder the operation of bleaching is
rendered more difficult, more expensive, and more [illegible].
the thread must be left longer in the bleaching vat, handled with more
care and twisted harder to discharge the lye from it In weaving I use the same reeds as formerly although at the first
I had others made for the purpose. I now however make reeds of
the same description as are used by others, and I have now for
three or four months been manufacturing [illegible] cloth of numbers
5 6 7. 8. without the use of starch, and as it has not been done
before I solicit the benefit of a Patent.

These experiments have been made in the Phoenix Mill at Patterson
N. Jersey (of which I am foreman) formerly owned by J. J. [illegible]
Esqrs. who spared no expense and whose instructions are such as
to lead me to hope for further improvements in the manufacture
of this article Witnesses } James Richards
Henry Thomas }
Richd. C. Dodd }

Exd. M.G.C.

(552 Words)

DRAFTSMAN'S DIVISION.

All communications should be addressed to "The Commissioner of Patents, Washington, D. C."

2—328 a.

DEPARTMENT OF THE INTERIOR,

United States Patent Office.

Washington, D. C., ............ 189__

SIR:

The printed copies of Patent No. [illegible] Richards Aug 10, 1821 are exhausted.

As soon as reprinted a copy will be mailed you to complete your order.

By direction of the Commissioner:

Very respectfully,

Chief Clerk.

314316—97—5m.